United States Patent
Fujita et al.

(10) Patent No.: US 9,619,433 B2
(45) Date of Patent: Apr. 11, 2017

(54) NORMAL-LINE DETECTION METHOD, NORMAL-LINE DETECTION DEVICE, AND MACHINE TOOL HAVING NORMAL-LINE DETECTION FUNCTION

(71) Applicant: MITSUBISHI HEAVY INDUSTRIES, LTD., Tokyo (JP)

(72) Inventors: Yoshihito Fujita, Tokyo (JP); Mikio Nakamura, Tokyo (JP); Hirofumi Ienaga, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 912 days.

(21) Appl. No.: 13/778,238

(22) Filed: Feb. 27, 2013

(65) Prior Publication Data

US 2013/0226513 A1    Aug. 29, 2013

(30) Foreign Application Priority Data

Feb. 29, 2012  (JP) ................................ 2012-043550

(51) Int. Cl.
| | | |
|---|---|---|
| *G01C 9/00* | (2006.01) | |
| *G06F 17/16* | (2006.01) | |
| *G01B 11/02* | (2006.01) | |
| *G01B 11/245* | (2006.01) | |

(52) U.S. Cl.
CPC ............ *G06F 17/16* (2013.01); *G01B 11/026* (2013.01); *G01B 11/245* (2013.01)

(58) Field of Classification Search
CPC ...... G06F 17/16; G01B 11/026; G01B 11/245
USPC ....................................................... 702/151
See application file for complete search history.

(56) References Cited

U.S. PATENT DOCUMENTS

| | | | | |
|---|---|---|---|---|
| 5,182,714 A | * | 1/1993 | Matsuura ........... | G05B 19/4207 700/161 |
| 5,241,485 A | | 8/1993 | Matsuura | |
| 5,327,351 A | * | 7/1994 | Matsuura ............. | B23Q 35/128 318/570 |

FOREIGN PATENT DOCUMENTS

| | | |
|---|---|---|
| EP | 0157299 B1 | 11/1988 |
| EP | 0 520 075 A1 | 12/1992 |
| JP | S61-155905 A | 7/1986 |
| JP | 61-269002 A | 11/1986 |

(Continued)

OTHER PUBLICATIONS

Extended European Search Report dated Jun. 28, 2013.

(Continued)

*Primary Examiner* — Sujoy Kundu
*Assistant Examiner* — Xiuquin Sun
(74) *Attorney, Agent, or Firm* — Birch, Stewart, Kolasch & Birch, LLP

(57) ABSTRACT

A normal-line detection method for finding the normal vector of a measurement surface of a measurement target by means of at least one distance detector and calculating the normal vector from the measurement results thus obtained is provided. The normal vector of the measurement surface is found by calculating the exterior product of a first vector which connects a first measurement point and a second measurement point and a second vector which connects a third measurement point and a fourth measurement point and is shifted in parallel such that an end thereof is set at any one of the first measurement point and the second measurement point.

6 Claims, 4 Drawing Sheets

(56) References Cited

FOREIGN PATENT DOCUMENTS

| JP | H04-082658 A | | 3/1992 |
|----|-----|-----|-----|
| JP | H04-143805 A | | 5/1992 |
| JP | 04241603 A | * | 8/1992 |
| JP | 8-71823 A | | 3/1996 |
| JP | 2001099641 A | * | 4/2001 |
| WO | WO 90/14924 A1 | | 12/1990 |

OTHER PUBLICATIONS

Hogan, et al. of Electroimpact Inc, USA and Moore, et al. of Airbus UK,. "Automated Wing Drilling System for the A380-GRAWDE" 2003 SAE International.
Japanese Notice of Allowance issued Mar. 29, 2016 in corresponding Japanese Application No. 2012-043550.
Japanese Office Action issued Jan. 5, 2015 in corresponding Japanese Application No. 2012-043550.

* cited by examiner

NORMAL-LINE DETECTION METHOD, NORMAL-LINE DETECTION DEVICE, AND MACHINE TOOL HAVING NORMAL-LINE DETECTION FUNCTION

TECHNICAL FIELD

The present invention relates to a normal-line detection method, a normal-line detection device, and a machine tool having a normal-line detection function, each of which uses a distance detector.

BACKGROUND ART

In machining, it is important to machine a workpiece as defined in a design drawing and as specified in a machining setting. To do so, it is necessary to figure out accurately the position, direction, and amount of machining of the workpiece.

For example, in the case of a structure such as the airframe of an aircraft formed by mechanically joining a large number of components with mechanically joining members such as rivets and fasters, accurate machining positions, directions, and amounts are necessary when holes to insert the mechanically joining members are drilled in the components.

When a main wing, which is a component of an aircraft, and a frame member or the like is mechanically joined with mechanically joining members or the like, such mechanical joining sometimes results in formation of protrusions on the surface of the main wing due to the mechanically joining members protruding from the surface of the main wing and/or formation of recesses in the surface of the main wing due to deep attachment holes provided for the mechanically joining members. These protrusions and recesses on and in the surface of the main wing affect the aerodynamic performance of the aircraft. Thus, the holes to insert the mechanically joining members are each drilled in the main wing, or a workpiece, at an accurate machining position in an accurate machining direction by an accurate machining amount so that the protrusions and recesses can be minimized. Here, the machining direction is usually perpendicular to the machining surface of the workpiece; hence, it is necessary to find the normal vector of the machining surface at the time of machining.

CITATION LIST

Patent Documents

{Patent Document 1} Japanese Patent Application Publication No. Sho 61-269002
{Patent Document 2} Japanese Patent Application Publication No. Hei 8-71823

SUMMARY OF INVENTION

Technical Problem

Patent Document 1 discloses a normal-line detection method for finding the normal vector of a machining surface, and Patent Document 2 discloses a machine tool having a normal-line detection function.

The normal-line detection method of Patent Document 1 is a method using a normal-line detection jig formed of an inner tube and an outer tube fitted to each other coaxially, the outer tube being circumferentially rotatable and axially movable relative to the inner tube. Specifically, two opposite contact sensors among multiple contact sensors arranged radially in the end surface of the inner tube on one side are brought into contact with a measurement target, and two opposite contact sensors arranged in the surfaces of two opposite protruding tip ends of the outer tube on the one side are brought into contact with the measurement target, so as to find a normal vector of a measurement surface of the measurement target.

This is a method which determines whether the axial direction of the normal-line detection jig coincides with the normal vector of the measurement surface. In other words, one needs to manually find the axial direction of the normal-line detection jig, the axial direction allowing both the two opposite contact sensors in the inner tube and the two contact sensors arranged in the tip ends of the outer tube to sense the measurement target. Thus, it takes time to complete the operation to make the axial direction of the normal-line detection jig coincide with the normal vector of the measurement surface. Moreover, the normal-line detection method of Patent Document 1 has difficulty in automatically controlling the posture of the normal-line detection jig.

The machine tool having a normal-line detection function in Patent Document 2 is a drilling machine including a machining jig provided with two non-contact sensors at one end and a motor-driven height adjustment mechanism at the other end. The two non-contact sensors are arranged to be symmetric about the drilling tool, and the height adjustment mechanism is arranged to be aligned with the two non-contact sensors and the machining tool. Through adjustment with the height adjustment mechanism to make the distances measured by the two non-contact sensors equal to each other, the machining direction of the machine tool is set perpendicular to the machining surface.

This is a device which detects perpendicularity to one direction in which the two non-contact sensors and the height adjustment mechanism are aligned, and therefore the device cannot detect perpendicularity to any direction other than the one direction. Thus, the device has not enough function to accurately find the normal vector of the machining surface.

The present invention has been made in view of the above problems, and an object thereof is to accurately calculate a normal vector of a measurement surface on the basis of distances measured by a distance detector, without having to manually look for the normal vector of the measurement surface.

Solution to Problem

A normal-line detection method according to a first aspect of the invention for solving the above problem is a normal-line detection method for finding a normal vector of a measurement surface of a measurement target by measuring a plurality of distances to the measurement target by means of at least one distance detector and calculating the normal vector from measurement results thus obtained, the normal-line detection method comprising the steps of: expressing, in three-dimensional coordinates, a plurality of measurement points on the measurement surface corresponding to a plurality of measurement positions from which the distance detector measures the distances to the measurement target, on the basis of the plurality of measurement positions and the plurality of measurement results obtained by the distance detector from the plurality of measurement positions; setting, as a first vector, a straight line connecting a first measurement point and a second measurement point in a three-dimensional coordinate system, the first measurement point being a point on the measurement target a distance to which is measured by the distance detector from a first measurement position being any one of the plurality of measurement positions, the second measurement point being a point on the measurement target a distance to which is measured by the distance detector from a second measurement position located opposite to the first measurement position; setting, as a second vector, a straight line connecting a third measurement point and a fourth measurement point in the three-dimensional coordinate system and shifted in parallel such that an end thereof is set at any one of the first measurement point and the second measurement point, the third measurement point being a point on the measurement target a distance to which is measured by the distance detector from a third measurement position located between the first measurement position and the second measurement position, the fourth measurement point being a point on the measurement target a distance to which is measured by the distance detector from a fourth measurement position located between the first measurement position and the second measurement position and being opposite to the third measurement position; and finding the normal vector of the measurement surface by calculating an exterior product of the first vector and the second vector.

The normal-line detection method according to a second aspect of the invention for solving the above problem is that wherein the first vector and the second vector are perpendicular to each other.

The normal-line detection method according to a third aspect of the invention for solving the above problem is that wherein the first measurement position, the second measurement position, the third measurement position, and the fourth measurement position are selected such that a difference between a first measurement result from the first measurement position and a second measurement result from the second measurement position is the greatest among the plurality of measurement results obtained by the distance detector.

The normal-line detection method according to a fourth aspect of the invention for solving the above problem is that wherein the distance detector is arranged radially at eight positions including the first measurement position, the second measurement position, the third measurement position, and the fourth measurement position.

The normal-line detection method according to a fifth aspect of the invention for solving the above problem is that wherein a non-contact sensor is used as the distance detector.

A normal-line detection device according to a sixth aspect of the invention for solving the above problem comprises: at least one distance detector configured to measure distances to a measurement target; and computation means for expressing, in three-dimensional coordinates, a plurality of measurement points on a measurement surface of the measurement target corresponding to a plurality of measurement positions from which the distance detector measures the distances to the measurement target, on the basis of the plurality of measurement positions and a plurality of measurement results obtained by the distance detector from the plurality of measurement positions, setting, as a first vector, a straight line connecting a first measurement point and a second measurement point in a three-dimensional coordinate system, the first measurement point being a point on the measurement target a distance to which is measured by the distance detector from a first measurement position being any one of the plurality of measurement positions, the second measurement point being a point on the measurement target a distance to which is measured by the distance detector performs measurement from a second measurement position located opposite to the first measurement position, setting, as a second vector, a straight line connecting a third measurement point and a fourth measurement point in the three-dimensional coordinate system and shifted in parallel such that an end thereof is set at any one of the first measurement point and the second measurement point, the third measurement point being a point on the measurement target a distance to which is measured by the distance detector from a third measurement position located between the first measurement position and the second measurement position, the fourth measurement point being a point on the measurement target a distance to which is measured by the distance detector from a fourth measurement position located between the first measurement position and the second measurement position and being opposite to the third measurement position, calculating a normal vector of the measurement surface by calculating an exterior product of the first vector and the second vector, and calculating a machining vector passing through a set point on a machining spot on the basis of the normal vector.

A machine tool having a normal-line detection function according to a seventh aspect of the invention for solving the above problem comprises: the normal-line detection device according to the sixth invention; and three-dimensional posture control means for three-dimensionally controlling a posture of the normal-line detection device and a machining tool to a direction calculated by the computation means.

Advantageous Effects of Invention

In the normal-line detection method according to the first aspect of the invention, the normal vector is calculated from the first vector and the second vector which are not parallel to each other. Accordingly, it is possible to accurately find the normal vector of both a flat surface and a curved surface. Moreover, the normal vector of the measurement surface is calculated from the distances measured by the distance detector. Thus, by applying the normal-line detection method according to the present invention to a machine tool or the like, the posture of the machining tool and the like of the machine tool can be automatically controlled easily. Accordingly, it is possible to shorten the time taken to complete the operation of controlling the posture of the machining tool and the like of the machine tool to make the machining direction or the like of the machine tool coincide with the normal vector of the measurement surface.

In the normal-line detection method according to the second aspect of the invention, the normal vector is calculated from the first vector and the second vector which are perpendicular to each other. Accordingly, it is possible to accurately find the normal vector of both a flat surface and a curved surface.

In the normal-line detection method according to the third aspect of the invention, the normal vector is calculated based on the measurement results from the opposite measurement positions that have the greatest difference between the measurement results. Accordingly, the accuracy of the normal vector to be calculated is improved.

In the normal-line detection method according to the fourth aspect of the invention, eight radially arranged distance detectors are used. Thus, measurement can be performed at eight positions simultaneously. Accordingly, even if some of the distance detectors cannot perform valid measurement due to the presence of a hole, an end surface, or the like, it is possible to find a normal vector by using the measured distances obtained from other distance detectors that can perform valid measurement.

In the normal-line detection method according to the fifth aspect of the invention, a non-contact sensor is used as the distance detector. Thus, the act of bringing the contact sensor into contact with the measurement target is eliminated. Accordingly, it is possible to shorten the time taken to complete the operation of finding the normal vector of the measurement surface.

In the normal-line detection device according to the sixth aspect of the invention, the normal vector is calculated from the first vector and the second vector which are perpendicular to each other. Accordingly, it is possible to accurately find the normal vector of both a flat surface and a curved surface. Moreover, the normal vector of the measurement surface is calculated from the distances measured by the distance detector. Thus, by applying the normal-line detection device according to the present invention to a machine tool or the like, the posture of the machining tool and the like of the machine tool can be automatically controlled easily. Accordingly, it is possible to shorten the time taken to complete the operation of controlling the posture of the machining tool and the like of the machine tool to make the machining direction or the like of the machine tool coincide with the normal vector of the measurement surface.

In the machine tool having a normal-line detection function according to the seventh aspect of the invention, the normal vector of the measurement surface is calculated by use of the normal-line detection device according to the fifth aspect of the invention, and the posture of the machining tool is controlled by using the three-dimensional posture control means in accordance with the calculated normal vector. Thus, the machining tool can coincide with the normal vector accurately and quickly. Accordingly, it is possible to perform accurate machining in the normal direction.

DESCRIPTION OF EMBODIMENTS

Hereinbelow, an embodiment of a normal-line detection method according to the present invention will be described in detail with reference to the accompanying drawings. It is needless to say that the present invention is not limited to the following embodiment and that various changes can be made without departing from the gist of the present invention, as a matter of course.

Embodiment 1

A normal-line detection method according to Embodiment 1 of the present invention will be described with reference to FIGS. 1 through 7.

In this embodiment, a machining jig 10 including a normal-line detection mechanism is attached to an unillustrated machine tool to enable machining of a measurement target 20, which is a machining target, from the normal direction of a measurement surface 21.

Figure 1:
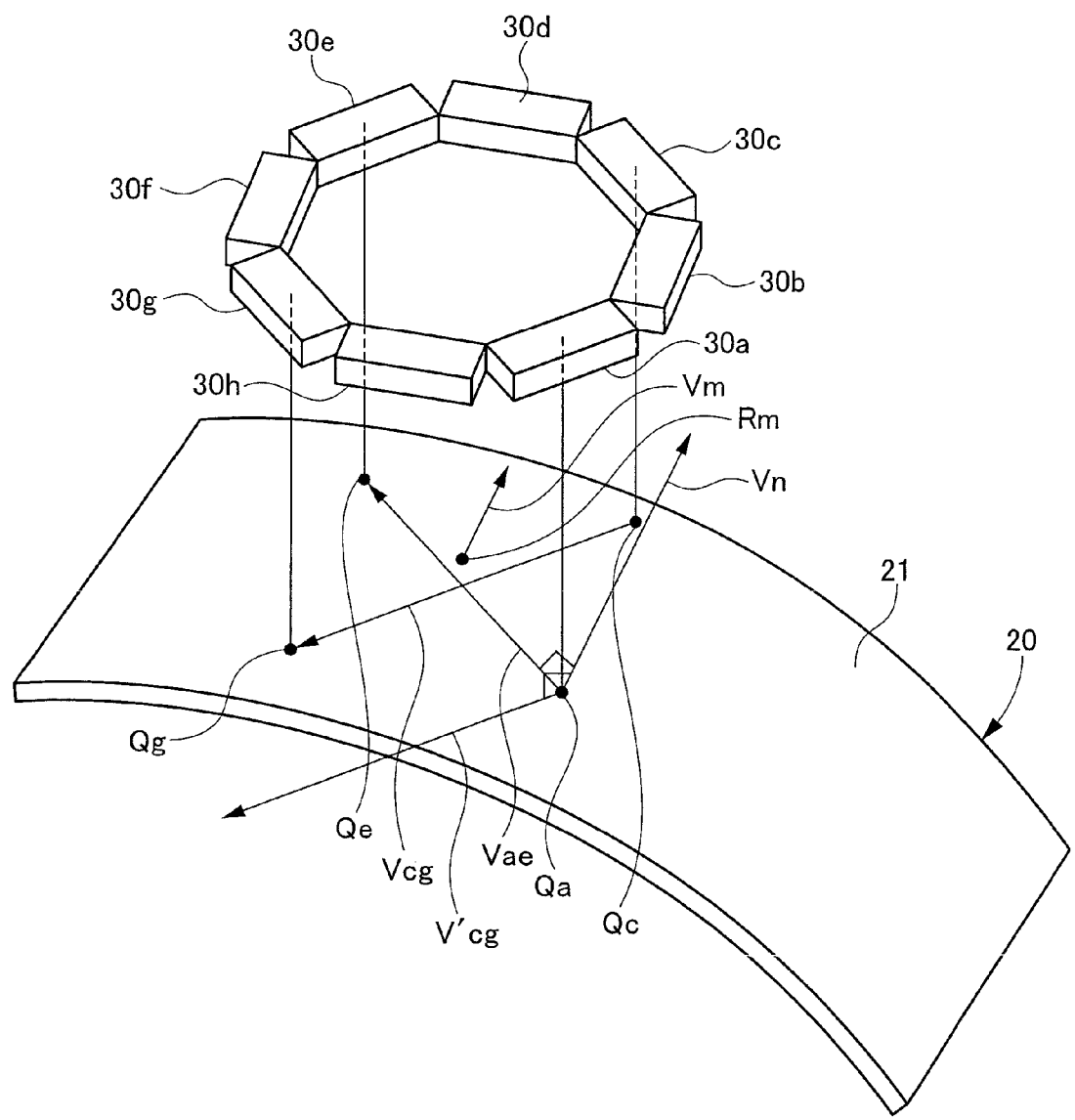
FIG. 1 is a conceptual view showing measurement with distance detectors according to Embodiment 1.
Figure 2:
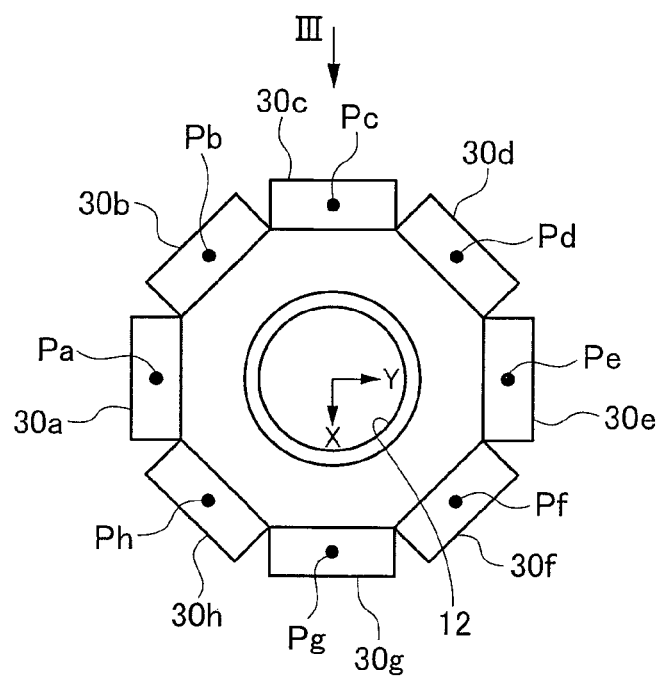
FIG. 2 is a plan view showing the arrangement of the distance detectors on a machining jig according to Embodiment 1 (a view seen in the direction of arrow II in FIG. 3).
Figure 3:
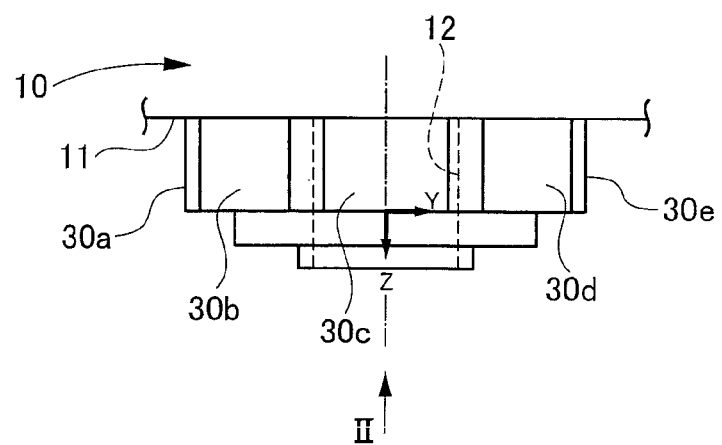
FIG. 3 is a side view seen in the direction of arrow III in FIG. 2.

As shown in FIGS. 1 and 2, the machining jig 10 includes: non-contact sensors 30 configured to measure distances to the measurement target 20; unillustrated computation means for calculating a normal vector Vn of the measurement surface 21 and a machining vector Vm on the basis of the distances L obtained by the non-contact sensors 30; and unillustrated three-dimensional posture control means for three-dimensionally controlling the posture of the machining jig 10 in a direction calculated by the computation means, along with machining tools of the unillustrated machine tool (the spindle, tool, etc.). In the case of the machining jig 10 of this embodiment, eight non-contact sensors 30a, 30b, 30c, 30d, 30e, 30f, 30g, and 30h are arranged radially on a machining-side end surface 11 of the machining jig 10.

Moreover, the machining jig 10 has a machining-side end hole 12 which a parallel jig 40 (FIGS. 4 and 5) or an inclined jig 50 (FIGS. 6 and 7) can be attached to and detached from. The parallel jig 40 is used to correct the non-contact sensors 30a to 30h, arranged on the machining jig 10, in the Z direction. The inclined jig 50 is used to correct the non-contact sensors 30a to 30h, arranged on the machining jig 10, in the X and Y directions. Here, the Z direction is the measurement direction of the non-contact sensors 30a to 30h. The X direction is any direction that is perpendicular to the Z direction. The Y direction is the direction perpendicular to the Z direction and to the X direction. Note that the machining-side end hole 12 in the machining jig 10 is used also as a hole through which to pass a machining part of the unillustrated machine tool at the time of machining.

Figure 4:
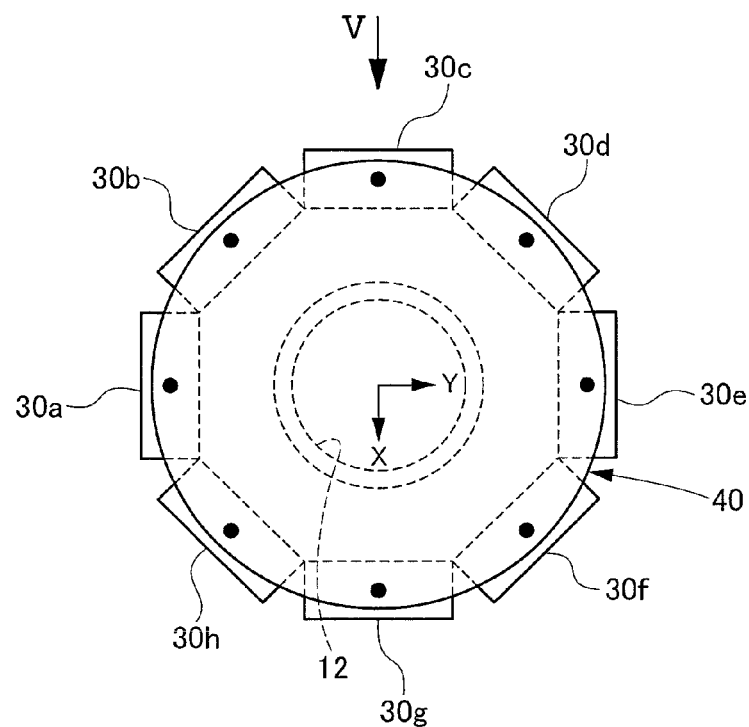
FIG. 4 is a plan view showing the machining jig with a parallel jig according to Embodiment 1 attached thereto (a view seen in the direction of arrow IV in FIG. 5).
Figure 5:
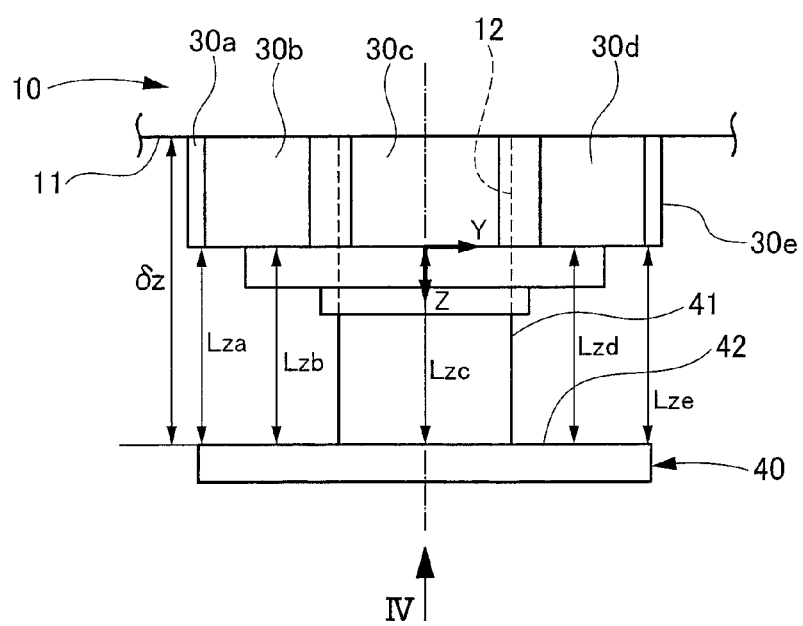
FIG. 5 is a side view seen in the direction of arrow V in FIG. 4.

The parallel jig 40 is a jig used to correct the non-contact sensors 30a to 30h in the Z direction and, as shown in FIGS. 4 and 5, includes an attachment cylinder portion 41 designed to be fitted into the machining-side end hole 12 of the machining jig 10, and also has a Z-direction correction surface 42 designed to correct the non-contact sensors 30a to 30h in the Z direction. In a state where the attachment cylinder portion 41 of the parallel jig 40 is inserted in the machining-side end hole 12 of the machining jig 10, and the parallel jig 40 is fixed to the machining jig 10, the Z-direction correction surface 42 is parallel to the machining-side end surface 11 of the machining jig 10, i.e. perpendicular to the Z direction, which is the measurement direction of the non-contact sensors 30a to 30h, and situated away from the machining-side end surface 11 of the machining jig 10 by a given distance δz. Note that because the Z-direction correction surface 42 is used to correct the eight non-contact sensors 30a to 30h in the Z direction, the Z-direction correction surface 42 has such a width that the eight non-contact sensors 30a to 30h can measure distances to the Z-direction correction surface 42.

Figure 6:
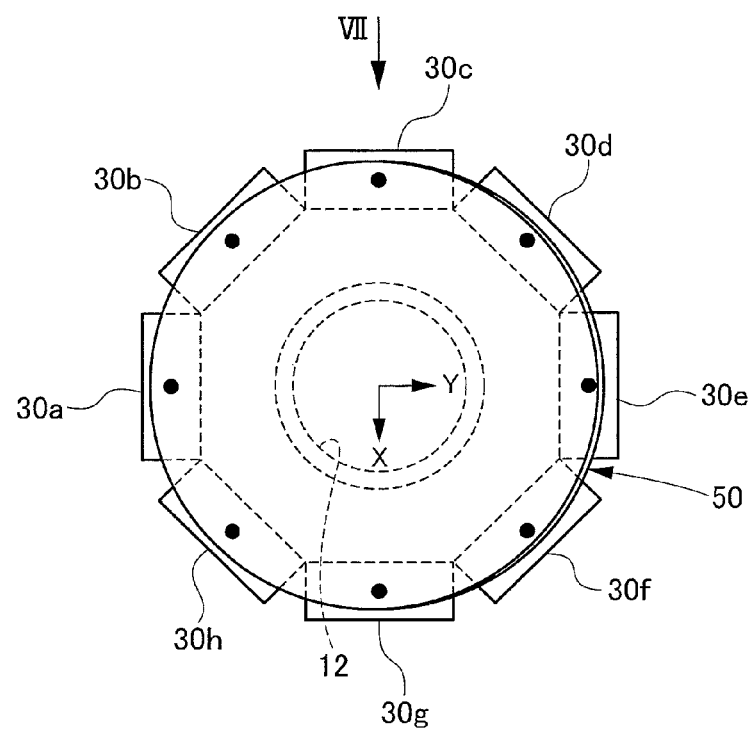
FIG. 6 is a plan view showing the machining jig with an inclined jig according to Embodiment 1 attached thereto (a view seen in the direction of arrow VI in FIG. 7).
Figure 7:
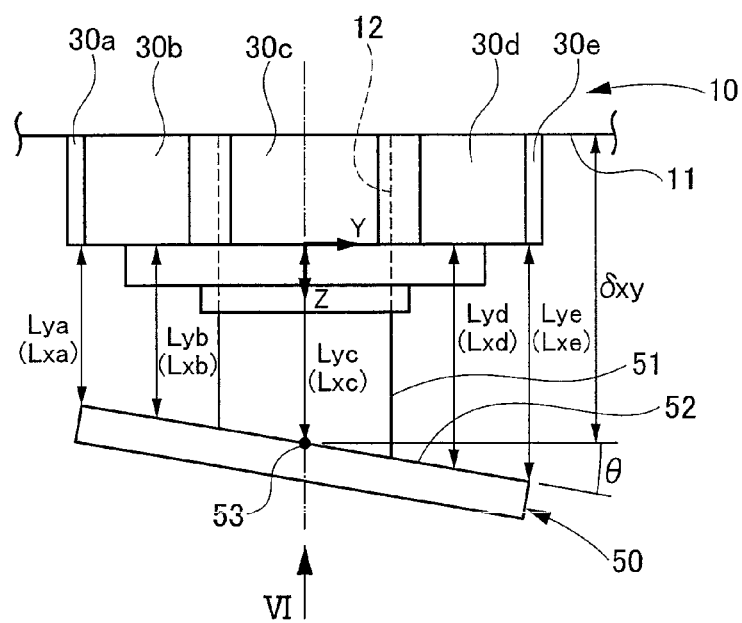
FIG. 7 is a side view seen in the direction of arrow VII in FIG. 6.

The inclined jig 50 is a jig used to correct the non-contact sensors 30a to 30h in the X and Y directions and, as shown in FIGS. 6 and 7, includes an attachment cylinder portion 51 designed to be fitted into the machining-side end hole 12 of the machining jig 10, and also has a XY-direction correction surface 52 designed to correct the non-contact sensors 30a to 30h in the X and Y directions. In a state where the attachment cylinder portion 51 is inserted in the machining-side end hole 12, and the inclined jig 50 is fixed to the machining jig 10, the XY-direction correction surface 52 is at a given angle θ with respect to the machining-side end surface 11 of the machining jig 10, and a center 53 of the XY-direction correction surface 52 is situated away from the machining-side end surface 11 of the machining jig 10 by a given distance δxy. Note that because the XY-direction correction surface 52 corrects the eight non-contact sensors 30a to 30h in the X and Y directions, the XY-direction correction surface 52 has such a width that the eight non-contact sensors 30a to 30h can measure distances to the XY-direction correction surface 52.

An unillustrated protrusion is provided on the outer wall surface of the attachment cylinder portion 51 of the inclined jig 50, and an unillustrated first recess is provided in the inner wall surface of the machining-side end hole 12 of the machining jig 10. By engaging the protrusion of the attachment cylinder portion 51 of the inclined jig 50 with the first recess of the machining-side end hole 12 of the machining jig 10, the inclined jig 50 can be attached with the XY-direction correction surface 52 in parallel to the X direction. Moreover, an unillustrated second recess is provided in the inner wall surface of the machining-side end hole 12 of the machining jig 10 at a position different from the first recess by 90 degrees in the circumferential direction. By engaging the protrusion of the attachment cylinder portion 51 of the inclined jig 50 with the second recess of the machining-side end hole 12 of the machining jig 10, the inclined jig 50 can be attached with the XY-direction correction surface 52 in parallel to the Y direction.

Now, description will be provided first for the correction of the non-contact sensors 30a to 30h, arranged on the machining jig 10, in the Z direction using the machining jig 10 and the parallel jig 40 with reference to FIG. 5.

The parallel jig 40 is attached to the machining jig 10, and the eight non-contact sensors 30a to 30h are caused to measure distances to the Z-direction correction surface 42 of the parallel jig 40. The parallel jig 40 and the Z-direction correction surface 42 are formed and mounted to the machining jig 10 such that the Z-direction correction surface 42 of the parallel jig 40 is situated away from the machining-side end surface 11 of the machining jig 10 by the given distance δz. Thus, by comparing measured distances Lza to Lzh to the Z-direction correction surface 42 obtained by the non-contact sensors 30a to 30h, it is possible to correct the eight non-contact sensors 30a to 30h in the Z direction. That is, it is possible to accurately figure out the arranged positions of the eight non-contact sensors 30a to 30h with respect to the machining jig 10 in the Z direction. Accordingly, it is possible to correct relative errors resulting from the mounting of the eight non-contact sensors 30a to 30h to the machining jig 10 and the like and thus to enable the non-contact sensors 30a to 30h to accurately measure distances in the Z direction.

Next, description will be provided for the correction of the non-contact sensors 30a to 30h, arranged on the machining jig 10, in the X direction using the machining jig 10 and the inclined jig 50 with reference to FIG. 7.

The inclined jig 50 is attached to the machining jig 10 such that the XY-direction correction surface 52 is parallel to the Y direction, and the eight non-contact sensors 30a to 30h are caused to measure distances to the XY-direction correction surface 52 of the inclined jig 50. The inclined jig 50 and the XY-direction correction surface 52 are formed and mounted to the machining jig 10 such that the XY-direction correction surface 52 is at the given angle θ with respect to the machining-side end surface 11 of the machining jig 10 and that the center of the XY-direction correction surface 52 is situated away from the machining-side end surface 11 of the machining jig 10 by the given distance δxy. Thus, by comparing measured distances Lxa to Lxh obtained by the non-contact sensors 30a to 30h and the calculation value geometrically found from the given angle θ and the given distance δxy making up the XY-direction correction surface 52, it is possible to correct the eight non-contact sensors 30a to 30h in the X direction. That is, it is possible to accurately figure out arranged positions Xa to Xh of the eight non-contact sensors 30a to 30h with respect to the machining jig 10 in the X direction. Accordingly, it is possible to correct relative errors resulting from the mounting of the eight non-contact sensors 30a to 30h to the machining jig 10 and the like and thus to enable the non-contact sensors 30a to 30h to accurately measure distances in the X direction.

Next, description will be provided for the correction of the non-contact sensors 30a to 30h, arranged on the machining jig 10, in the Y direction using the machining jig 10 and the inclined jig 50 with reference to FIG. 7.

The inclined jig 50 is attached to the machining jig 10 such that the XY-direction correction surface 52 is parallel to the X direction, and the eight non-contact sensors 30a to 30h are caused to measure distances to the XY-direction correction surface 52 of the inclined jig 50. The inclined jig 50 is formed and mounted to the machining jig 10 such that the XY-direction correction surface 52 is at the given angle θ and that the center of the XY-direction correction surface is situated away from the machining-side end surface 11 of the machining jig 10 by the given distance δxy. Thus, by comparing measured distances Lya to Lyh obtained by the non-contact sensors 30a to 30h and the calculation value geometrically found from the given angle θ and the given distance δxy making up the XY-direction correction surface 52, it is possible to correct the eight non-contact sensors 30a to 30h in the Y direction. That is, it is possible to accurately figure out arranged positions Ya to Yh of the eight non-contact sensors 30a to 30h with respect to the machining jig 10 in the Y direction. Accordingly, it is possible to correct relative errors resulting from the mounting of the eight non-contact sensors 30a to 30h to the machining jig 10 and the like and thus to enable the non-contact sensors 30a to 30h to accurately measure distances in the Y direction.

Next, description will be provided for the normal-line detection method for finding the normal vector Vn of the measurement surface 21 using the machining jig 10 with reference to FIG. 1.

The normal vector Vn is found by: selecting four of the eight non-contact sensors 30a to 30h arranged on the machining jig 10; and calculating the normal vector Vn from measured distances La, Le, Lc, and Lg obtained by selected pairs of non-contact sensors 30a and 30e and non-contact sensors 30c and 30g to be described later and from the arranged positions Pa (Xa, Ya), Pe (Xe, Ye), Pc (Xc, Yc), and Pg (Xg, Yg) of the selected pairs of non-contact sensors 30a and 30e and non-contact sensors 30c and 30g.

It is not always the case that measured distances La to Lh to the measurement target 20 obtained by the eight non-contact sensors 30a to 30h are all valid. This can be due to the presence of a hole at any of measurement points Qa to Qh on the measurement target 20 or due to displacement of any of the measurement points Qa to Qh off the end of the measurement target. However, not all the non-contact sensors 30a to 30h have to provide valid measured distances La to Lh. It is only necessary that certain valid ones of the measured distances La to Lh satisfy a necessary condition. If the certain valid ones of the measured distances La to Lh do not satisfy the necessary condition, the machining jig 10 is moved slightly in parallel, and then the non-contact sensors 30a to 30h are caused to measure the distances to the measurement target 20 so that the certain valid ones of the measured distances La to Lh can satisfy the necessary condition.

The measured distances La to Lh to the measurement target 20 are obtained by using the eight non-contact sensors 30a to 30h arranged on the machining jig 10. The non-contact sensors 30a to 30h arranged on the machining jig 10 include four pairs of non-contact sensors located opposite to each other, namely, 30a and 30e, 30b and 30f, 30c and 30g, and 30d and 30h. A measured distance difference ΔLae which is the difference between the measured distances La and Le obtained from the non-contact sensors 30a and 30e is calculated, as well as a measured distance difference ΔLbf which is the difference between the measured distances Lb and Lf obtained from the non-contact sensors 30b and 30f, a measured distance difference ΔLcg which is the difference between the measured distances Lc and Lg obtained from the non-contact sensors 30c and 30g, and a measured distance difference ΔLdh which is the difference between the measured distances Ld and Lh obtained from the non-contact sensors 30d and 30h.

$$\Delta Lae = |La - Le|$$

$$\Delta Lbf = |Lb - Lf|$$

$$\Delta Lcg = |Lc - Lg|$$

$$\Delta Ldh = |Ld - Lh| \quad \{\text{Formula 1}\}$$

The pairs' measured distance differences ΔLae, ΔLbf, ΔLcg, and ΔLdh are compared to select the pair with the greatest difference.

$$\Delta Lae > \Delta Lbf > \Delta Ldh > \Delta Lcg \quad \{\text{Formula 2}\}$$

The pair of non-contact sensors 30a and 30e located opposite to each other and the pair of non-contact sensors 30c and 30g perpendicular to the pair of non-contact sensors 30a and 30e located opposite to each other are set as the aforementioned selected pairs of non-contact sensors 30a and 30e and non-contact sensors 30c and 30g.

Note that there may be an invalid measurement result among the measured distances La to Lh obtained from the non-contact sensors 30a to 30h in some cases. For example, in the case where the measured distance Lb is invalid, the above-described comparison is not performed, and the pairs of non-contact sensors 30a and 30e and non-contact sensors 30c and 30g located opposite to each other are selected.

The measurement points Qa, Qc, Qe, and Qg on the measurement surface 21, the distances to which are to be measured by the selected pairs of non-contact sensors 30a and 30e and non-contact sensors 30c and 30g, are expressed in the form of three-dimensional coordinates on the basis of the arranged positions Pa (Xa, Ya), Pc (Xc, Yc), Pe (Xe, Ye), and Pg (Xg, Yg) of the non-contact sensors 30a, 30c, 30e, and 30g in the X and Y directions as well as the measured distances La, Lc, Le, and Lg obtained by the non-contact sensors 30a, 30c, 30e, and 30g.

Measurement Point Qa (Xa, Ya, Za)
Measurement Point Qc (Xc, Yc, Zc)
Measurement Point Qe (Xe, Ye, Ze)
Measurement Point Qg (Xg, Yg, Zg)

Based on the three-dimensional coordinates, a vector Vae connecting the measurement points Qa and Qe, the distances to which are measured by the opposite non-contact sensors 30a and 30e, and a vector Vcg connecting the measurement points Qc and Qg, the distances to which are measured by the opposite non-contact sensors 30c and 30g, are calculated.

$$Vae = s\begin{pmatrix} Xe - Xa \\ Ye - Ya \\ Ze - Za \end{pmatrix} + \begin{pmatrix} Xa \\ Ya \\ Za \end{pmatrix} \quad \{\text{Formula 3}\}$$

$$Vcg = t\begin{pmatrix} Xg - Xc \\ Yg - Yc \\ Zg - Zc \end{pmatrix} + \begin{pmatrix} Xc \\ Yc \\ Zc \end{pmatrix}$$

where s and t are given real numbers.

The vectors Vae and Vcg are skew. Thus, one of the vectors, which is Vcg, is shifted parallel to be a vector V'cg passing through the measurement point Qa (Xa, Ya, Za) which is one end of the vector Vae.

$$V'cg = t\begin{pmatrix} Xg - Xc \\ Yg - Yc \\ Zg - Zc \end{pmatrix} + \begin{pmatrix} Xa \\ Ya \\ Za \end{pmatrix} \quad \{\text{Formula 4}\}$$

The vector Vn, which is the exterior product of the vector Vae and the vector V'cg, is calculated. The vector Vn is a direction vector crossing the vector Vae and the vector V'cg at a right angle and represents a normal vector of the measurement surface 21.

$$Vn = V'cg \times Vae \quad \{\text{Formula 5}\}$$

$$= u\begin{pmatrix} (Yg - Yc)(Ze - Za) - (Ye - Ya)(Zg - Zc) \\ (Zg - Zc)(Xe - Xa) - (Ze - Za)(Xg - Xc) \\ (Xg - Xc)(Ye - Ya) - (Xe - Xa)(Yg - Yc) \end{pmatrix} + \begin{pmatrix} Xa \\ Ya \\ Za \end{pmatrix}$$

where u is a given real number.

From the normal vector Vn thus calculated, the machining vector Vm passing through a set point Rm (Xm, Ym, Zm) on the machining spot is calculated.

$$Vm = v\begin{pmatrix} (Yg - Yc)(Ze - Za) - (Ye - Ya)(Zg - Zc) \\ (Zg - Zc)(Xe - Xa) - (Ze - Za)(Xg - Xc) \\ (Xg - Xc)(Ye - Ya) - (Xe - Xa)(Yg - Yc) \end{pmatrix} + \begin{pmatrix} Xm \\ Ym \\ Zm \end{pmatrix} \quad \{\text{Formula 6}\}$$

where v is a given real number.

The three-dimensional posture control means is caused to control the posture of the machining jig 10 along with the unillustrated machine tool such that the machining part of the unillustrated machine tool coincides with the found machining vector Vm. After this control, the measured distances La, Lc, Le, and Lg obtained by the opposite non-contact sensors 30a, 30c, 30e, and 30g have the same value.

With the normal-line detection method and the three-dimensional posture control described above, the normal vector of the measurement surface 21 is found accurately. By making the orientations of the machining jig 10 and the machining tools of the unillustrated machine tool coincide with the calculated normal vector, it is possible to perform accurate machining in the normal direction.

Moreover, in addition to the calculation of the normal vector Vn on the basis of the measured distances La, Le, Lc, and Lg obtained by the selected pairs of non-contact sensors 30a and 30e and non-contact sensors 30c and 30g and the arranged positions Pa (Xa, Ya), Pe (Xe, Ye), Pc (Xc, Yc), and Pg (Xg, Yg) of the selected pairs of non-contact sensors 30a and 30e and non-contact sensors 30c and 30g, it is possible to calculate a normal vector V'n on the basis of the measured distances Lb, Lf, Ld, and Lh obtained by the non-contact sensors 30b, 30f, 30d, and 30h and the arranged positions Pb (Xb, Yb), Pf (Xf, Yf), Pd (Xd, Yd), and Ph (Xh, Yh) of these selected pairs of non-contact sensors 30b and 30f and non-contact sensors 30d and 30h. Then, the average of the multiple normal vectors Vn and V'n may be calculated. In this way, the normal vector of the measurement surface 21 can be found more accurately.

Note that the normal-line detection method and the three-dimensional posture control operation of this embodiment may be repeated multiple times. In this way, the normal vector of the measurement surface 21 can be found more accurately, whereby the machining jig 10 and the machining tools of the unillustrated machine tool can coincide with the more accurately calculated normal vector.

The normal-line detection can be affected by the measured distances La to Lh obtained by the non-contact sensors 30a to 30h. Thus, the non-contact sensors 30a to 30h need to perform accurate measurement. In this respect, in this embodiment, the eight non-contact sensors 30a to 30h attached to the machining jig 10 are subjected to the above-described corrections in the X, Y, and Z directions. It is, of course, not necessary to perform the corrections in the X, Y, and Z directions of this embodiment if the non-contact sensors 30 can in advance be arranged accurately and thus perform measurement accurately.

Although the eight non-contact sensors 30a to 30h are arranged radially as distance detectors to perform the normal-line detection in this embodiment, the present invention is not limited to this configuration. For example, a movable non-contact sensor 30 may be employed, and the normal vector may be calculated based on multiple measured distances L obtained by the one non-contact sensor 30 from multiple measurement positions P. Alternatively, the normal vector may be calculated based on measured distances L obtained by using a contact sensor(s) as a distance detector(s).

Moreover, although the normal vector is found in this embodiment by using the machining jig 10 including a normal-line detection mechanism, the present invention is not limited to this configuration. For example, the machine tool itself may be provided with the distance detector(s), the computation means, and the three-dimensional posture control means to perform the normal-line detection without using the machining jig 10.

INDUSTRIAL APPLICABILITY

The normal-line detection method according to the present invention is capable of detecting a normal vector of a target surface accurately in a short period of time and is applicable to target surfaces including both flat and curved surfaces and thus is highly beneficial to drilling for making holes in an aircraft's main wings and the like.

REFERENCE SIGNS LIST

10 MACHINING JIG
11 MACHINING-SIDE END SURFACE
12 MACHINING-SIDE END HOLE
20 MEASUREMENT TARGET
21 MEASUREMENT SURFACE
30 NON-CONTACT SENSOR
40 PARALLEL JIG
41 ATTACHMENT CYLINDER PORTION
42 Z-DIRECTION CORRECTION SURFACE
50 INCLINED JIG
51 ATTACHMENT CYLINDER PORTION
52 XY-DIRECTION CORRECTION SURFACE
53 CENTER

The invention claimed is:

1. A normal-line detection method for finding a normal vector of a measurement surface of a measurement target by measuring a plurality of distances to the measurement target by means of at least one distance detector and calculating the normal vector from measurement results thus obtained, the normal-line detection method included in a machine jig and comprising the steps of:
   receiving a plurality of measurement positions from non-contact sensors arranged on the machine jig, wherein the distance detector on the machine jig measures the distances to the measurement target using the received measurement positions;
   expressing, in three-dimensional coordinates, a plurality of measurement points on the measurement surface corresponding to the plurality of measurement positions from which the distance detector measures the distances to the measurement target, on the basis of the plurality of measurement positions and the plurality of measurement results obtained by the distance detector from the plurality of measurement positions;
   setting, as a first vector, a straight line connecting a first measurement point and a second measurement point in a three-dimensional coordinate system, the first measurement point being a point on the measurement target a distance to which is measured by the distance detector from a first measurement position being any one of the plurality of measurement positions, the second measurement point being a point on the measurement target a distance to which is measured by the distance detector from a second measurement position located opposite to the first measurement position;
   setting, as a second vector, a straight line connecting a third measurement point and a fourth measurement point in the three-dimensional coordinate system and shifted in parallel such that an end thereof is set at any one of the first measurement point and the second measurement point, the third measurement point being a point on the measurement target a distance to which is measured by the distance detector from a third measurement position located between the first measurement position and the second measurement position, the fourth measurement point being a point on the measurement target a distance to which is measured by the distance detector from a fourth measurement position located between the first measurement position and the second measurement position and being opposite to the third measurement position;
   finding the normal vector of the measurement surface by calculating an exterior product of the first vector and the second vector using a computer; and
   controlling a posture of the machine jig using the determined normal vector.

2. The normal-line detection method according to claim 1, wherein the first vector and the second vector are perpendicular to each other.

3. The normal-line detection method according to claim 1, wherein the first measurement position, the second measurement position, the third measurement position, and the fourth measurement position are selected such that a difference between a first measurement result from the first measurement position and a second measurement result from the second measurement position is the greatest among the plurality of measurement results obtained by the distance detector.

4. The normal-line detection method according to claim 1, wherein the distance detector is arranged radially at eight positions including the first measurement position, the second measurement position, the third measurement position, and the fourth measurement position.

5. The normal-line detection method according to claim 1, wherein a non-contact sensor is used as the distance detector.

6. A normal-line detection device comprising:
   a machine jig;
   at least one distance detector configured to measure distances to a measurement target; and
   a computer configured to:
     receive a plurality of measurement positions from non-contact sensors on the machine jig, wherein the distance detector on the machine jig measures the distances to the measurement target using the received measurement positions;
     express, in three-dimensional coordinates, the plurality of measurement points on a measurement surface of the measurement target corresponding to a plurality of measurement positions from which the distance detector measures the distances to the measurement target, on the basis of the plurality of measurement positions and a plurality of measurement results obtained by the distance detector from the plurality of measurement positions,
     set, as a first vector, a straight line connecting a first measurement point and a second measurement point in a three-dimensional coordinate system, the first measurement point being a point on the measurement target a distance to which is measured by the distance detector from a first measurement position being any one of the plurality of measurement positions, the second measurement point being a point on the measurement target a distance to which is measured by the distance detector performs measurement from a second measurement position located opposite to the first measurement position,
     set, as a second vector, a straight line connecting a third measurement point and a fourth measurement point in the three-dimensional coordinate system and shifted in parallel such that an end thereof is set at any one of the first measurement point and the second measurement point, the third measurement point being a point on the measurement target a distance to which is measured by the distance detector from a third measurement position located between the first measurement position and the second measurement position, the fourth measurement point being a point on the measurement target a distance to which is measured by the distance detector from a fourth measurement position located between the first measurement position and the second measurement position and being opposite to the third measurement position,
     calculate a normal vector of the measurement surface by calculating an exterior product of the first vector and the second vector,
     calculate a machining vector passing through a set point on a machining spot on the basis of the normal vector,
     control a posture of the machine jig using the calculated normal vector.

* * * * *